United States Patent
Schlag et al.

(10) Patent No.: US 6,256,342 B1
(45) Date of Patent: Jul. 3, 2001

(54) METHOD AND REGENERATIVE FILTER FOR EQUALIZING DIGITALLY TRANSMITTED SIGNALS

(75) Inventors: Erwin Schlag, Vaihingen; Henning Bülow, Stuttgart, both of (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/175,660

(22) Filed: Oct. 20, 1998

(30) Foreign Application Priority Data

Oct. 25, 1997 (DE) ............................................. 197 47 249
Feb. 18, 1998 (DE) ............................................. 198 06 682

(51) Int. Cl.[7] ............................. H03H 7/30; H03H 7/40; H03K 5/159
(52) U.S. Cl. ............................................ 375/229; 708/323
(58) Field of Search ................................. 375/229, 233, 375/230, 232, 234, 231; 359/115, 189; 708/316, 322, 323

(56) References Cited

U.S. PATENT DOCUMENTS 5,191,462 * 3/1993 Gitlin et al. .......................... 359/189
5,805,478 * 9/1998 Kim ...................................... 708/323

FOREIGN PATENT DOCUMENTS 3912713  10/1989  (DE).
0398169  5/1990  (EP).
0702454  3/1996  (EP).

OTHER PUBLICATIONS

"Adaptive Nonlinear Cancellation for High–Speed Fiber–Optic Systems", J. Winters et al, *Journal of Lightwave Technology*, vol. 10, No. 7, Jul. 1992, pp. 971–977.

* cited by examiner

Primary Examiner—Stephen Chin
Assistant Examiner—Lenny Jiang

(57) ABSTRACT

A method and a regenerative filter for equalizing an input digital signal is proposed, wherein the received input signals is processed by means of threshold decision elements, multiplexers, and a delay unit 6, which regenerates a delayed signal for switching the multiplexer, wherein the input signal 1 passes in parallel through at least 4 threshold decision elements 2 and the output signals 3 of the threshold decision elements 2 are connected by at least one multiplexer 4 to the delay unit 6 and the delay unit 6 is comprised of at least two delay stages, whose delayed signals 9, 10 switch the at least one multiplexer 4.

17 Claims, 6 Drawing Sheets

MFLP

METHOD AND REGENERATIVE FILTER FOR EQUALIZING DIGITALLY TRANSMITTED SIGNALS

BACKGROUND OF THE INVENTION

1. Technical Field

The invention is based on a method and a regenerative filter for equalizing digitally transmitted signals in accordance with the independent claims.

2. Discussion of the Related Art

In addition to attenuation, the signal dispersion of optical signals is the main limiting criterion that influences transmission paths and bit rates in fiber optic systems. The effects of dispersion and their limitations can be compensated for by means of suitable signal processing of the electrical signals obtained. In practical application, it is necessary to embody the signal processing adaptively since the dispersion effects of the fiber change over time. As a result of the dispersion effects, for example caused by polarization mode dispersion (PMD), there are overlaps of signal components with different polarizations. The signals are chronologically blurred due to these dispersion effects and arrive in the optical receiver in a jumbled state. Nonlinear electronic filters are used for equalizing the signals in order to once more separate out the signals that arrive at the receiver overlapping one another due to dispersion effects. The published article "Adaptive Nonlinear Cancellation for High-speed Fiber Optic Systems" by Jack Winters and S. Kasturia, *Journal of Lightwave Technology*, Vol. 10, No. 9, July 1992, p. 971 ff. has disclosed a nonlinear electronic filter. In order to reduce the time problems with the analog regeneration in the nonlinear filter, two threshold decision elements with different thresholds are connected to each other in parallel. The results of the parallel connected threshold decision elements are combined by means of a controllable multiplexer. The embodiment represented in FIG. 7 on page 975 of the above-cited article uses two threshold decision elements, whose outputs are connected to a multiplexer. A D flip-flop and a feedback loop switch the multiplexer of the filter. Peripheral electronics determine the thresholds to be adjusted and store them by way of capacitors. The time constants of the threshold electronics are consequently fixed. With a nonlinear filter of this kind, signals can be equalized when the delays between the slow and rapid signal components vary within a time pulse.

In order to recover the signal clock pulse with which the threshold decision element is triggered, conventional clock circuits with phase-locked loops, so-called PLL circuits (phase-locked loop), can be used. However, with very intense distortions, which arise for example with a high PMD, the following problem occurs: the signal clock pulse, which is regenerated with conventional clock circuits, has an intense phase fluctuation whose magnitude is a function of the signal distortion. Therefore, with intense signal distortions, usually the clock circuit must be enlarged further by additional phase shifters, which are incorporated as adaptive regulators into the clock pulse path in order to compensate for phase fluctuations.

SUMMARY OF INVENTION

In contrast, the method according to the invention, as well as the regenerative filter according to the invention, has the advantage that echo delays between slow and fast signal components over a number of time pulses can be equalized. Furthermore, distortions from different sources, such as PMD (polarization mode dispersion) and chromatic dispersion, which occur at the same time, can likewise be reduced. To that end, at least four threshold decision elements are advantageously connected in parallel, wherein the outputs are united by way of at least one multiplexer and the switching of the multiplexers is carried out by way of at least one feedback loop. It is furthermore possible to adapt the thresholds to the changes of the dispersion behavior of the transmission fiber by way of an external unit, without the threshold adjustment having to follow a time-critical regeneration.

The object of recovering the signal clock pulse is attained by means of an equalizing circuit, which is equipped with a clock circuit according to the invention, which, by means of comparing the input signal to a predeterminable threshold, detects the rising or falling edge of the input signal and which regenerates the signal clock pulse by means of synchronization with this edge.

Advantageous improvements and updates of the method and the regenerative filter disclosed below are possible by means of the measures shown.

It is particularly advantageous that the regeneration of the output signals of the delay circuit is carried out with the data clock pulse c while the adjustment of the decision elements by way of a processor unit can occur more slowly.

It is furthermore advantageous that the slower adjustment of the thresholds takes place based on measurement values which are determined by an external detection of the output signal and are transmitted to a processor unit for evaluation.

It is furthermore advantageous that the delay unit is comprised of a master-slave D flip-flop and a subsequent latch flip-flop. As a result, a reliable detection of the signal state is achieved in the first feedback loop, while a rapid regeneration can take place in the second feedback loop.

The delay unit can be advantageously realized as a shift register with a logic unit.

A regenerative filter is advantageously used in a combination circuit, wherein the regenerative filter is connected in parallel either with single-mode, multiple linear filters or with other regenerative filters. It is advantageous that decision element thresholds are embodied as both constant and adjustable.

For a further equalization of the signals, series connecting an analog filter turns out to be an advantage, wherein this filter can be designed as an adaptive filter. For an optimal signal equalization, filter combinations can be used in which regenerative filters having two threshold decision elements cooperate with linear, adaptive, or non-adaptive filters, as well as with regenerative filters according to the invention having at least four threshold decision elements.

The signal clock pulse recovery in the equalizing circuit can be embodied in a particularly advantageous way by virtue of the fact that the clock circuit is provided with a first circuit that compares the input signal to the predeterminable threshold in order to limit the amplitude of the input signal to a value range predetermined by the threshold, and detects the rising or falling edge of the amplitude-limited input signal within a predeterminable time window in order to generate output pulses (FP) of uniform duration. The edges are detected, for example, by scanning at different times and by comparing these scanned values. The edge detection is particularly simple and reliable due to the amplitude limiting.

It is particularly advantageous if the clock circuit also includes a second circuit that follows the first circuit and regenerates the signal clock pulse from the output pulses by synchronizing with its edges. Therefore, a phase-locked loop (PLL) or a filter is additionally connected subsequently in order to further stabilize the edge detection.

In addition, it is advantageous if the first circuit is an edge-triggered mono-flop with a dead time element that delays the amplitude-limited input signal by the duration that determines the magnitude of the time window and is smaller than approximately half the bit duration of the input signal, with an inverter stage that inverts the time-delayed input signal, and with an AND gate that logically links the amplitude-limited input signal and the inverted, time-delayed input signal to each other in order to generate the output pulses. By means of these simple measures, a time window is set by way of the amplitude-limited signal in order to assure that even with particularly intense signal distortion, only the rising (positive) edge or only the falling (negative) edge is detected.

Another advantage is produced if the second circuit, which is preferably a phase-locked loop (PLL), synchronizes itself to the rising edge of the output pulses. As a result, a stabilized detection of the positive edge is achieved, i.e. the edge that is not distorted by echo components in the signal.

It is also particularly advantageous if in addition to the clock circuit, the equalizing circuit is equipped with a detector circuit which, in order to change the threshold of the at least one cyclical threshold decision element containing the regenerative filter, compares the output signal of the filter to the input signal delayed by the filter passage time and from this, derives a signal quality of the equalized output signal, which determines the threshold. The equalizing circuit thus additionally contains a circuit that adjusts the filter as a function of the signal quality. Since the clock circuit supplies a stable signal clock pulse, this circuit can be simply designed; in particular, no adaptation means are required in order to compensate for phase fluctuations. In particular, an eye detector is suitable as the circuit, which detector determines the eye diagram of the equalized output signal and generates a voltage that changes in accordance with the eye opening and indicates the signal quality.

BRIEF DESCRIPTION OF THE DRAWINGS

Exemplary embodiments of the invention are represented in the drawings and will be explained in more detail in the subsequent description.

DETAILED DESCRIPTION OF PREFERRED EMBODIMENTS

Figure 1:
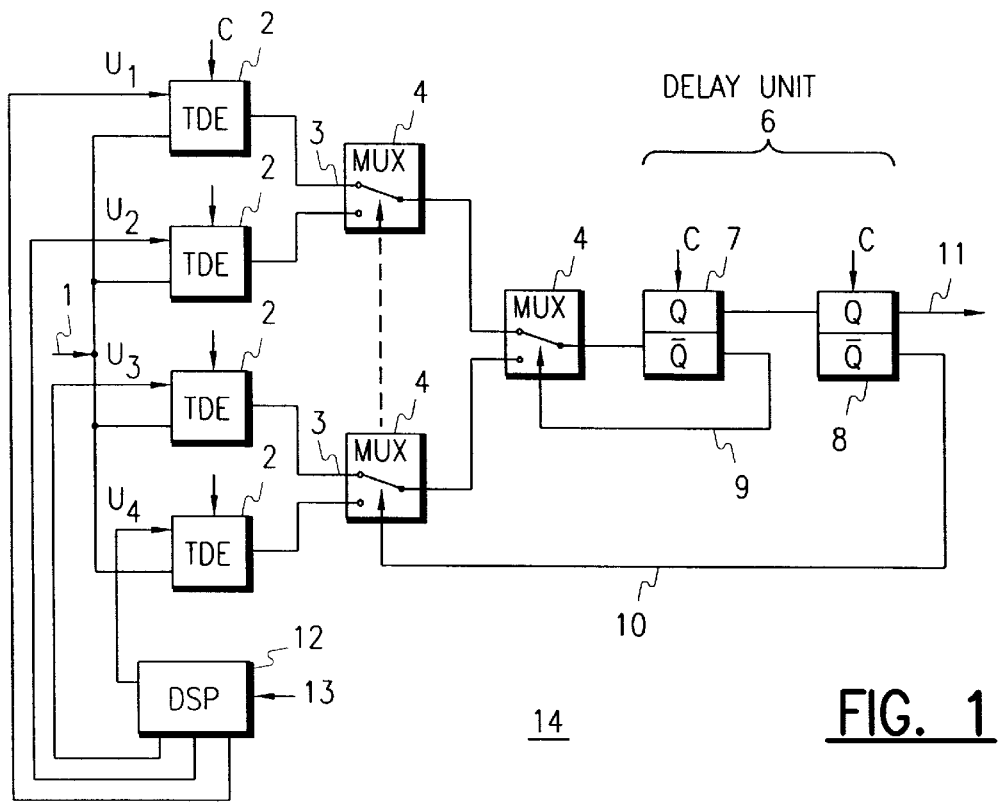
FIG. 1 shows a circuit with four decision elements.

FIG. 1 shows four threshold decision elements 2, which are connected to one another in parallel and are connected on the input end to the input signal 1. The threshold decision elements 2 have other inputs for the thresholds $U_{1...4}$ as well as for the data clock pulse c. The outputs of pairs of threshold decision elements 2 are input to respective multiplexers 4. The output of the first multiplexer stage 4 is connected to one of the inputs of another multiplexer stage 4'. The output of this multiplexer 4' is provided to the input of a D flip-flop 7, whose Q output is connected to the input of a latch flip-flop 8. The $\overline{Q}$ output of the D flip-flop 7 is fed back into the multiplexer 4' of the second stage as a control signal. The output Q of the latch flip-flop 8 furnishes the reconstructed output signal 11. The $\overline{Q}$ output of the latch flip-flop 8 is fed back into the first multiplexer stage 4 by way of the feedback loop 10.

The input signal is distorted due to dispersion effects. As can be seen, for example, from FIG. 5, the input signal has a stepped structure since polarization components of the signal are transported both quickly and slowly by way of the optical fiber. The stepped input signal at the optoelectronic converter is plotted here, for example, for a propagation time difference of 1.5 periods as well as a uniform intensity distribution between the different polarization modes.

The input signal is divided up between the four threshold decision elements 2. Each threshold decision element 2 has an individual threshold $U_{1-4}$. The adjustment of this threshold takes place by way of a digital processor unit 12, which evaluates the measurement results 13 of an external measurement. The evaluation of the eye diagram of the output signal 11 can serve as an external measurement. An adaptation of the threshold $U_{1-4}$ is calculated from the measured eye opening. Depending on the threshold, the outputs of the threshold decision elements supply output signals 1 or 0, which are provided to in the first multiplexer stage. A signal travels to the master-slave D flip-flop 7 by way of the second multiplexer stage 4'. This master-slave flip-flop delays the arriving signal by one data clock pulse. Since this is a master-slave flip-flop, the storage of the signal is very reliable and the time delay between the input signal and the output signal is exactly one data clock pulse. As long as the clock pulse is 1, the input information is read into the master. The output state remains unchanged since the slave is blocked. If the clock pulse goes to 0, the master is blocked and in this manner, the state which existed immediately before the negative clock pulse edge is frozen in place. At the same time, the slave is released and the state of the master is transmitted to the output. There is no clock cycle state in which the input data act directly on the output. Therefore, a flip-flop of this kind is used for a reliable detection and independent evaluation of the input signal. For the time-critical feedback loop 10, a transparent flip-flop 8 is used, which switches the first multiplexer stage 4 without a further delay. The use of a latch flip-flop is necessary in an embodiment with two feedback loops since the second loop 10 is very time-critical. A circuit of this kind with four threshold decision elements can optimally compensate for signal delays between the two polarization modes of a bit of 0 ps up to approximately 200 ps at 10 Gbit/s. The thresholds of the threshold decision elements 2 are first optimally adjusted based on measurements and can be re-regulated by way of the digital processor unit 12 if the dispersion behavior of the fiber changes over time.

Figure 2:
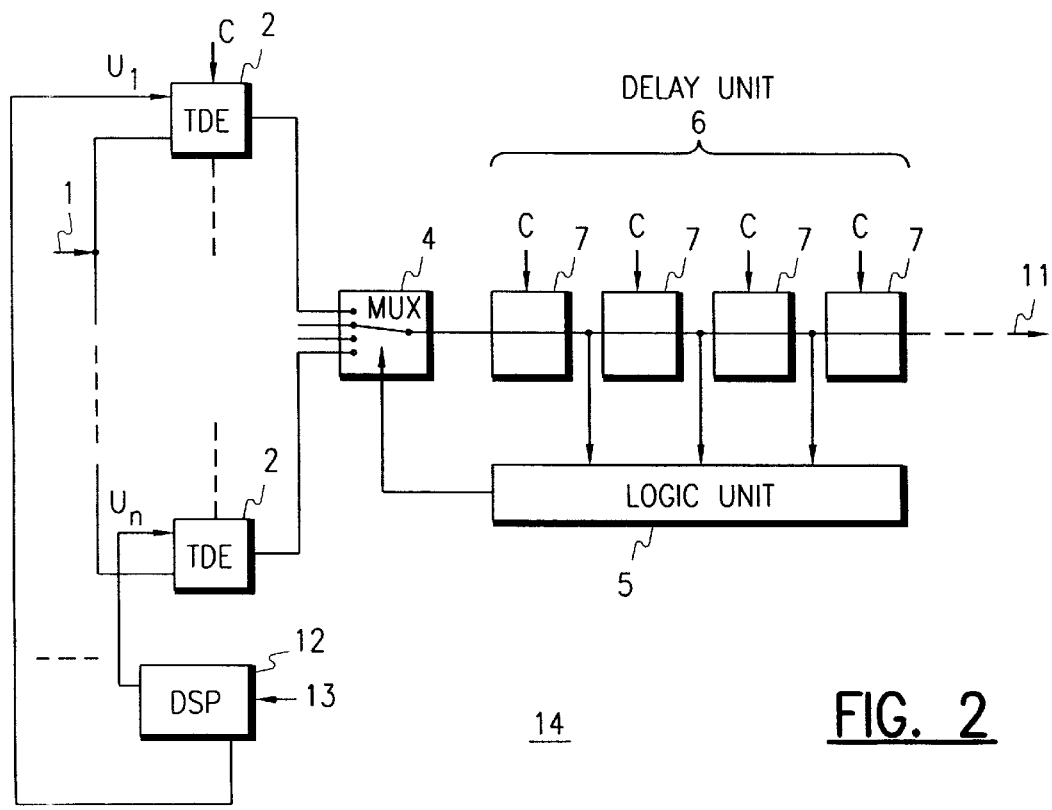
FIG. 2 shows a circuit with more than four decision elements.
Figure 3:
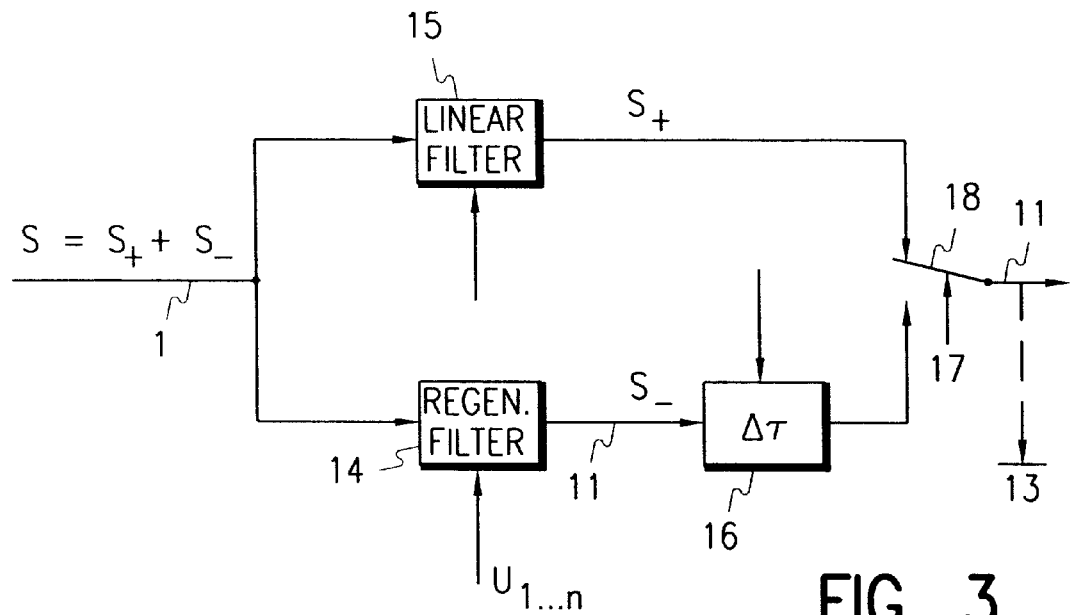
FIG. 3 shows a filter combination.

FIG. 2 shows an exemplary embodiment in which the input signal 1 is divided up between more than four decision elements 2. The number of the decision elements is a function of the type of distortion. The decision elements each in turn have a threshold input $U_1$, to $U_n$, which is externally regulated by a digital processor 12. The outputs of the decision elements 2 are provided to a multiplexer 4, which is switched by a logic unit 5. The logic unit 5 evaluates the outputs of individual flip-flops 7 of the delay logic, i.e., the logical stages of the delay unit 6, in the form of a shift register, in order to switch the multiplexer 4. The output signal 11 is present at the output of the shift register. In this embodiment, the regeneration of the time-delayed output signals of the flip-flop to the multiplexer is no longer time-critical so that normal master-slave versions can be used here. FIG. 3 shows the parallel connection of a regenerative filter 14 according to the invention to for example linear filters 15. The input signal 1 is comprised of the signal components of both polarization modes $S_+$ and $S_-$. The two signal branches are united at a switch 18, which is thrown by a changeover pulse 17. The quality of the output signal 11 is determined by an external detection 13. An adjustable delay unit 16 is provided for compensating for propagation time differences in the two signal branches.

Figure 4:
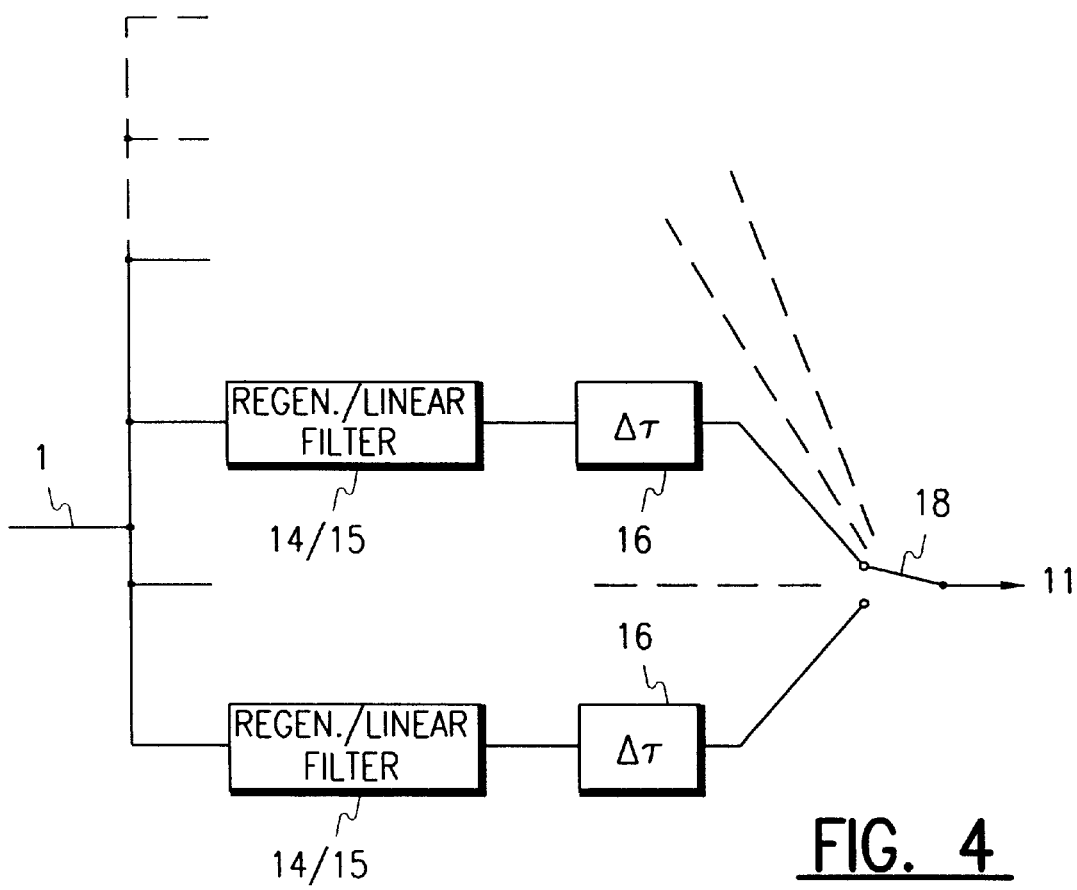
FIG. 4 shows an enlarged filter combination.

FIG. 4 indicates the parallel connection of a number of regenerative and/or linear filters. Delay elements 16 adapt the signal propagation times of the signal branches to each other so that after a changeover at the switch 18, the signal continues synchronously.

Figure 5:
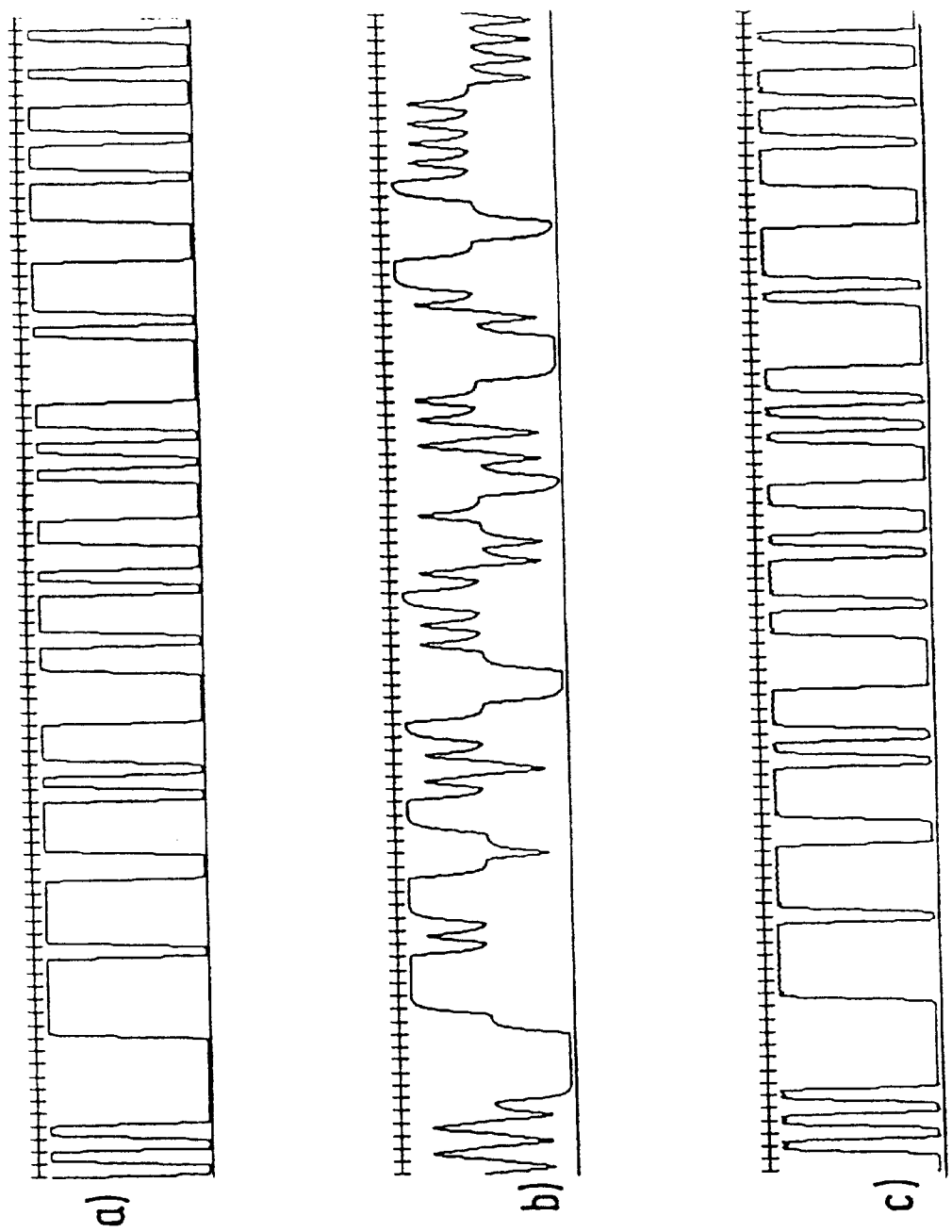
FIG. 5 shows a measurement of filter results.

FIG. 5 shows an exemplary signal a), which forms distortions b) due to dispersion effects. After passing through the regenerative filter according to the invention, the original signal c) is recovered.

Figure 6:
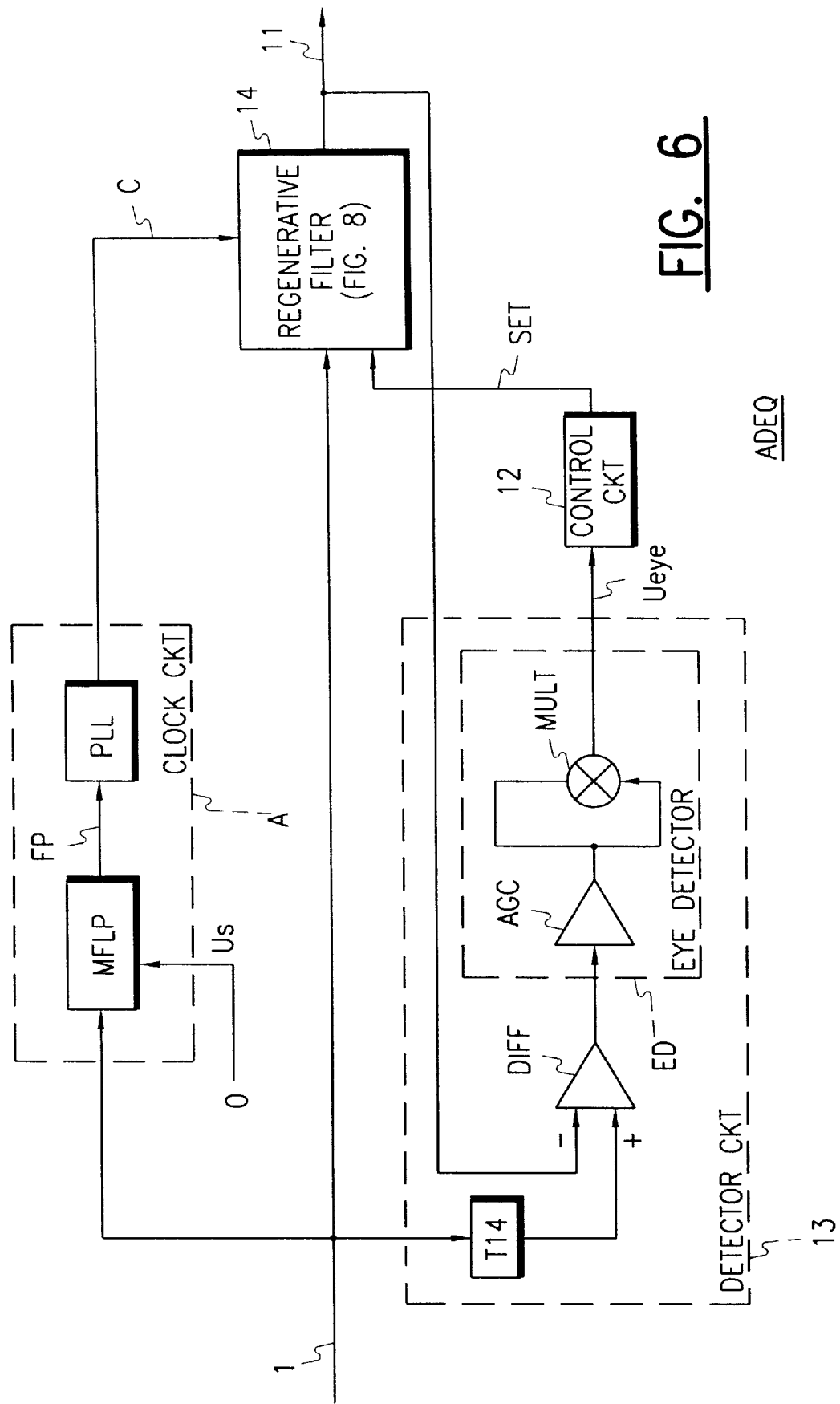
FIG. 6 shows the block circuit diagram of an equalizing circuit for an optical receiver.

The equalizing circuit ADEQ schematically represented in FIG. 6 has a regenerative filter 14, which receives the input signal 1 and supplies the output signal 11. In addition, the equalizing circuit has a clock circuit A, which recovers the signal clock pulse C from the input signal 1 in order to supply it to the clock pulse input of the regenerative filter 14. Furthermore, the equalizing circuit includes a detector circuit 13 with two inputs to which the input signal 1 to be equalized and the equalized output signal 11 are supplied and this detector circuit 13 generates an output voltage Ueye, which indicates the signal quality of the equalized output signal 11.

Moreover, the equalizing circuit includes a control circuit 12, which follows the detector circuit 13 and generates control signals from the voltage Ueye, in particular thresholds SET, in order to adjust the filter parameters of the regenerative filter 14.

The clock circuit A includes a first circuit MFLP that compares the input signal 1 to a predeterminable threshold Us and generates the output pulses FP. In addition, the clock circuit A includes a second circuit PLL that follows the first circuit and generates the signal clock pulse C from the output pulses FP by synchronizing with its edges. The design and operation of the clock circuit A will be further addressed below in conjunction with FIG. 7.

The detector circuit 13 shown in FIG. 6 includes a comparator DIFF, which compares the input signal 1 to the output signal 11 and generates a difference signal. At the input of the comparator, the input signal 1 is delayed by the lag introduced by the delay filter T14 by means of a dead time element in order to provide the input signal to the comparator at the same time as the output signal 11. In addition, the detector circuit 13 includes an eye detector ED that is connected after the comparator and from the difference signal, generates the voltage Ueye that indicates the signal quality of the output signal 11. To that end, the eye detector ED includes an input amplifier AGC and a subsequent multiplexer MULT that corresponds to a mixing stage. The voltage Ueye is generated through the amplification of the difference signal in the amplifier AGC (automatic gain control) and the subsequent processing in the mixing stage MULT. The peak-to-peak voltage of the eye opening is kept constant in the mixing stage. This voltage depicts the so-called eye opening, which represents a measure for the quality of the output signal 11. From this voltage Ueye, filter parameters, in particular thresholds SET, are generated in the subsequent control circuit 12, which adaptively adjust the regenerative filter 14.

FIG. 6 shows that the regenerative filter 14 is triggered by the following signals: first, by the signal clock pulse C that is regenerated by the clock circuit A according to the invention and second, by the thresholds SET that are generated by means of the eye detector circuit in order to adjust the filter parameters. Both measures can be employed independently of each other in order to improve the operation of the regenerative filter. This means that in the first place, the equalizing circuit can be improved solely by means of the clock circuit in such a way that a phase-locked, stable clock pulse is generated and that in the second place, the equalizing circuit can be improved solely by means of the detector circuit in such a way that the regenerative filter is adaptively adjusted as a function of the signal quality. However, it is particularly advantageous to employ both measures together because this achieves the fact that the filter 14 is already triggered by a stabilized signal clock pulse C and consequently delivers a phase-stabilized output signal 11, which in turn can be more easily processed in the eye detector circuit ED. Since the output signal 11 is stabilized, no signal processing steps are required for phase compensation inside the eye detector evaluation circuit 12, which signal processing steps would have to compensate for phase fluctuations in the output signal.

Figure 7:
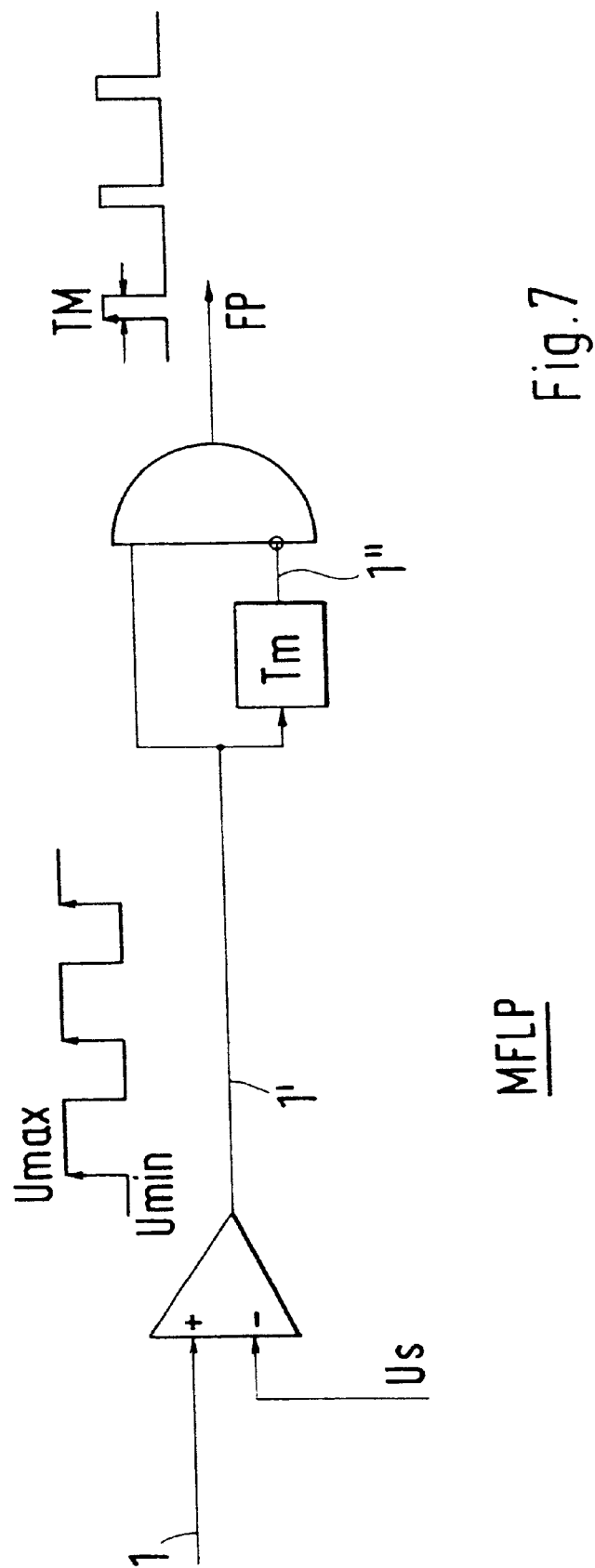
FIG. 7 shows the layout of a clock circuit for this equalizing circuit.

Before the design of the regenerative filter 14 is described in more detail in conjunction with FIG. 8, first FIG. 7 will be described, which shows the schematic layout of the comparator MFLP of the clock circuit A according to the invention:

FIG. 7 shows the first circuit MFLP of the clock circuit A, which recovers output pulses FP with a uniform duration TM from the input signal 1. This first circuit has the function of an edge-triggered mono-flop and at the input, contains a comparator or a Schmitt trigger, which compares the input signal 1 to a threshold Us. This comparator is followed by an AND logic gate that has an inverted input and a non-inverted input. The output voltage of the comparator is conveyed directly to the non-inverted input and indirectly to the inverted input by way of a dead time (delay) element Tm. Then the output pulses FP with the uniform duration TM appear at the output of the AND gate. These output pulses FP are then conveyed to the second circuit of the clock circuit A, which is not represented in FIG. 2 (see PLL in FIG. 6).

The operation of the edge-triggered mono-flop MFLP shown in FIG. 7 is as follows:

By means of comparing the input signal 1 to the threshold Us inside the comparator, the input signal 1 is first amplitude limited so that in the event of a logical "0", a minimal voltage Umin is set and in the event of a logical "1", a maximal voltage Umax is set. If a Schmitt trigger is employed, then an output signal is generated whose level fluctuates between "0" and "1" (binary value range). The threshold Us is selected so that it is approximately one fourth to one third the amplitude of the input signal 1. This achieves the fact that a positive edge is detected as soon as the signal course of the input signal 1 abruptly increases (see FIG. 5) and as long as no distortions can occur due to echo components. Therefore the comparator generates an amplitude-limited signal 1' at its output, and this signal changes abruptly between Umin and Umax, wherein its positive edge to a large extent corresponds precisely to the positive (rising) edge of the input signal 1. It is also possible to detect the falling edge, i.e. the negative edge. However, it is advantageous to detect the positive edge since this is not yet distorted by means of echo components (also see FIG. 5).

In the subsequent logic circuit, the amplitude-limited input signal 1' is processed further into the output pulses FP. The switching of the AND gate with the dead time (delay) element Tm achieves the fact that the amplitude-limited input signal 1' is subjected to a time window function, wherein the positive edge is maintained and the later signal components are extracted. Therefore, the output signal of the AND gate is comprised of output pulses FP with the same width TM. These output pulses could already be used as a signal clock pulse for triggering the regenerative filter; they should, however, be additionally stabilized in the second circuit by means of a subsequent synchronization stage or by means of a subsequent filter (see PLL in FIG. 6).

Figure 8:
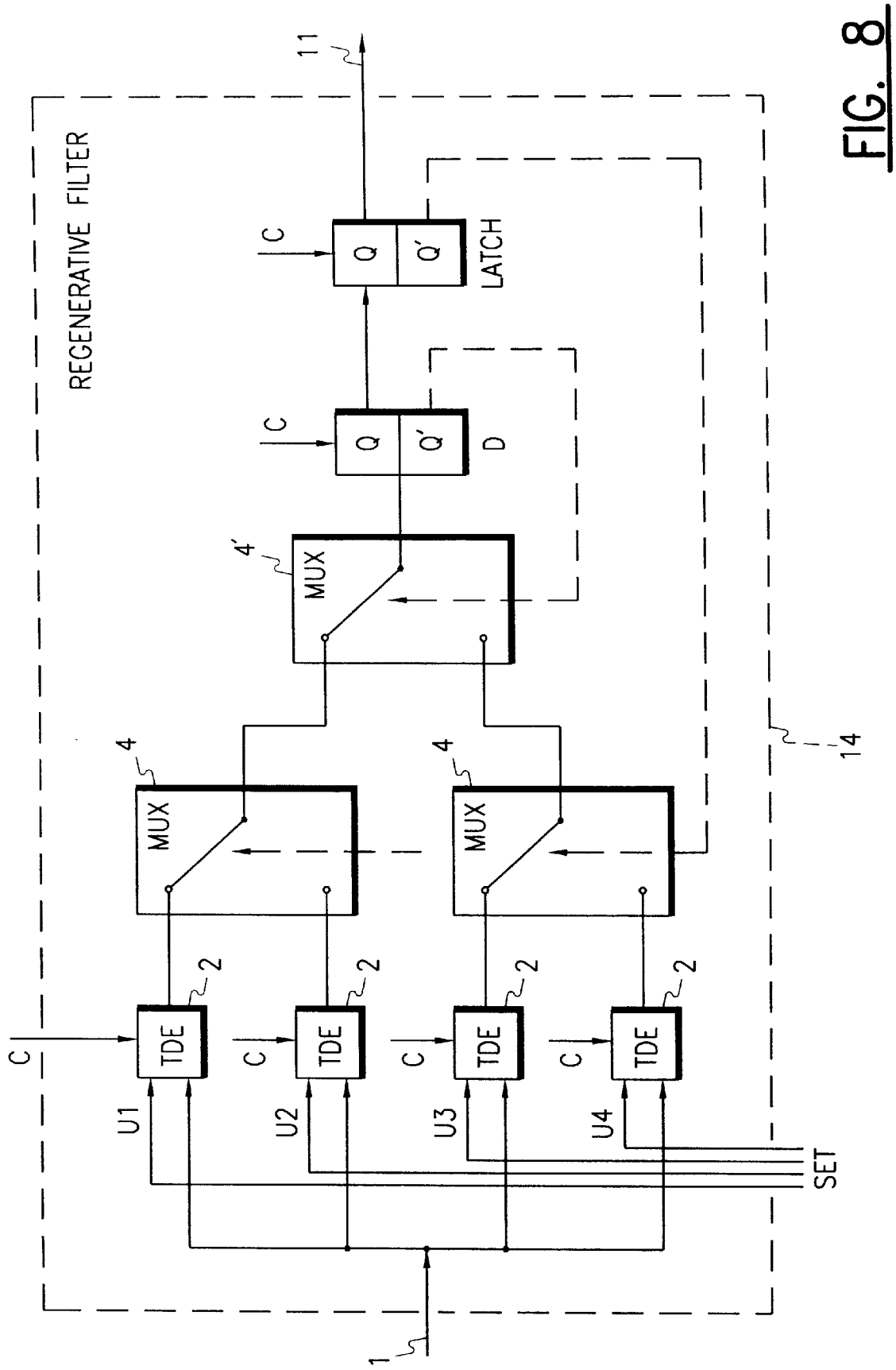
FIG. 8 shows a regenerative filter for this equalizing circuit.

FIG. 8 shows the schematic layout of the regenerative filter 14, which produces the equalized output signal 11 from the distorted input signal 1 and which is triggered by the signal clock pulse C as well as being adaptively adjusted by the filter parameters SET. A circuit with only one cyclical threshold decision element can be used as a regenerative filter. Preferably, though, at least two threshold decision elements are used, precisely four in this exemplary embodiment.

FIG. 8 shows four threshold decision elements 2, which are connected in parallel to one another and on the input end, are connected to the input signal 1. The threshold decision elements 2 have other inputs for the thresholds SET (which are divided into the voltages $U_1$, $U_2$, $U_3$, and $U_4$) and for the signal data clock pulse C. The outputs of the threshold decision elements 2 are respectively provided to a multiplexer 4 in pairs. The outputs of the first multiplexer stage 4 are connected to the inputs of another multiplexer stage 4'. The output of this multiplexer 4' is provided to the input of a D flip-flop, whose Q output is connected to the input of a latch flip-flop. The inverted $\overline{Q}$ output of the D flip-flop is fed back into the multiplexer 4' of the second stage. The output Q of the latch flip-flop furnishes the reconstructed output signal 11. The inverted $\overline{Q}$ output of the latch flip-flop is fed back into the first multiplexer stage 4 by way of the feedback loop 10. The input signal 1 is split and provided to each of the four threshold decision elements 2. Each threshold decision element 2 has an individual threshold (the voltages $U_{1-4}$). The adjustment of these thresholds SET takes place by way of a digital processor unit 12, which evaluates the eye opening (voltage Ueye) at the output of the detector circuit 13 (see FIG. 1). An adaptation of the thresholds $U_{1-4}$ is thus calculated from the measured eye opening and by means of its change. Depending on the threshold, the outputs of the threshold decision elements 2 supply logical signals "1" or "0", which are present in the first multiplexer stage 4. From the second multiplexer stage 4', a Q output signal is provided to the D flip-flop, which is used as a master-slave flip-flop and delays the arriving signal by one data clock pulse.

Since this is a master-slave flip-flop, the storage of the signal is very reliable and the time delay between the input signal and the output signal is exactly one data clock pulse. As long as the clock pulse is at logical "1", the input information is read into the master. The output state remains unchanged since the slave is blocked. If the clock pulse goes to logical "0", the master is blocked and in this manner, the state which existed immediately before the negative clock pulse edge is frozen in place. At the same time, the slave is released and the state of the master is transmitted to the output. There is no clock cycle state in which the input data act directly on the output. Therefore, a flip-flop of this kind is used for a reliable detection and independent evaluation of the input signal.

A master-slave flip-flop or a rapid latch flip-flop, i.e. a transparent flip-flop, can be used for the time-critical feedback loop, which switches the first multiplexer stage 4 without a further delay. The use of the latch flip-flop is necessary in an embodiment with two feedback loops since the second loop is very time-critical. A circuit of this kind, with four threshold decision elements can optimally compensate for signal delays between the two polarization modes of a bit from 0 to approximately 200 ps at 10 Gbit/s.

The thresholds SET of the threshold decision element 2 are first optimally adjusted based on measurements and variations of the threshold, and can subsequently be re-regulated by way of the processor unit 12 if the dispersion behavior of the fiber changes over time.

The invention has been described in the example of an optical receiver, however it can also be used in receivers for non-optical signals, particularly in receivers for digital wideband networks in which signals are transmitted via wires or in a wireless manner.

What is claimed is:

1. Method for equalizing digital signals received after transmission, wherein a received signal (1) is evaluated based on thresholds ($U_1$ . . . ), characterized by carrying out a threshold decision with at least four threshold decision elements (2), wherein at least one multiplexer (4) connects outputs of the threshold decision elements (2) to a subsequent delay unit (6), wherein the at least one multiplexer (4) is responsive to at least one regenerative output signal (9, 10) of the delay unit (6) by adaptively adjusting the thresholds ($U_1$ . . . ) of the threshold decision elements (2) by means of a digital processor unit (12) and by carrying out regeneration of the at least one output signal of the delay circuit (6) in response to a data clock pulse (C) and by adjusting thresholds of the threshold decision elements (2) in a time frame slower than a time period of said data clock pulse.

2. Regenerative filter (14) for equalizing digitally transmitted signals, with threshold decision elements (2), at least one multiplexer (4), and a delay unit (6), said delay unit responsive to a multiplexed signal from said at least one multiplexer for providing a delayed signal for switching said at least one multiplexer, characterized in that an input signal (1) propagates in parallel through at least four threshold decision elements (2) wherein output signals (3) of the threshold decision elements (2) are connected by said at least one multiplexer (4) to the delay unit (6), the delay unit (6) comprising at least one delay stage (7, 8) for providing at least one delayed signal (9, 10) for switching the at least one multiplexer (4) that both the decision elements and the delay unit are responsive to a clock signal regenerated from the input signal that the thresholds are adjustable by means of a signal processor (12) responsive to an evaluation signal (13) having a magnitude indicative of measurement values of an output signal (11) of said filter and that adjustments to the thresholds are made in a time frame slower than a time period of the clock signal.

3. The regenerative filter (14) according to claim 2, characterized in that the delay unit (6) is comprised of a master-slave D flip-flop (7) and a latch flip-flop (8).

4. The regenerative filter (14) according to claim 2, characterized in that the delay unit (6) is a shift register, and a logic unit (5) provides the regenerative output signal that is provided to the multiplexer.

5. The regenerative filter (14) according to claim 2 for use in a circuit with filters connected in parallel and having respective outputs connected to an output line by way of a multiplexer, wherein the regenerative filter (14) is for use in parallel with at least one linear filter (15) or at least one regenerative filter (14), wherein delay elements (16) compensate for varying signal propagation times.

6. The regenerative filter (14) according to claim 5, further characterized in that the regenerating filter includes regenerative filters with two threshold decision elements.

7. An equalizing circuit (ADEQ) responsive to a digital input signal received after transmission, comprising
   a regenerative filter (14) responsive to said digital input signal for providing an output signal wherein said regenerative filter includes at least one cyclical threshold decision element (2) that is clocked by a signal clock pulse (C) regenerated from said digital input signal and wherein said element is also responsive to the digital input signal (1) and to a threshold (SET) signal for changing a threshold of the threshold decision element for changing an output signal (11) of the equalizing circuit, and
   a clock circuit (A), which detects a rising or falling edge of the digital input signal (1) by means for comparing the digital input signal (1) to a predeterminable threshold (Us) and for providing the signal clock pulse (C) by means for synchronizing with this rising or falling edge.

8. The equalizing circuit (ADEQ) according to claim 7, wherein the clock circuit (A) includes a first circuit (MFLP) that compares the digital input signal (1) to the predeterminable threshold (Us) for amplitude limiting the digital input signal (1') to a value range (Umin; Umax) predetermined by the threshold signal, and for detecting the rising or falling edge of the amplitude-limited input signal within a predeterminable time window in order to generate amplitude limited output signal pulses (FP) of uniform duration ($T_M$).

9. The equalizing circuit (ADEQ) according to claim 8, characterized in that the clock circuit (A) includes a second circuit (PLL) that follows the first circuit (MFLP) and synchronizes the signal clock pulse (C) to the output signal pulses (FP) or filters a signal clock pulse frequency out of the output pulses.

10. The equalizing circuit (ADEQ) according to claim 9, characterized in that the second circuit is a phase-locked loop (PLL) that synchronizes itself to the output signal pulses (FP).

11. The equalizing circuit (ADEQ) according to claim 8, characterized in that the first circuit (MFLP) is an edge-triggered mono-flop (MFLP), with a dead time element ($T_M$) that delays the amplitude-limited input signal (1') by said uniform duration ($T_M$), which determines the magnitude of the time window and is smaller than half a bit duration of the input signal (1), with an inverter stage that inverts the time-delayed input signal (1"), and with an AND gate that logically links the amplitude-limited input signal (1') and the inverted, time-delayed input signal (1") to each other in order to generate the output signal pulses (FP).

12. The equalizing circuit (ADEQ) according to claim 7, further characterized by a detector circuit (13) which, in order to change the threshold (SET) of the at least one cyclical threshold decision element (2) of the regenerative filter (14), compares the output signal (11) of the filter to the input signal (1) delayed by a filter delay time (T14) and from this, derives a quality signal (Ueye) indicative of the quality of the equalized output signal (11), which determines the threshold (SET).

13. The equalizing circuit (ADEQ) according to claim 12, characterized in that the detector circuit (13) determines an eye diagram of the equalized output signal (11) and generates said quality signal (Ueye) that changes in accordance with an eye opening and indicates said quality of the equalized output signal.

14. An equalizing circuit (ADEQ) for equalizing digitally transmitted signals, comprising:
   a regenerative filter (14) which includes at least one threshold decision element (2) clocked by a signal clock pulse (C), wherein an input signal (1) of the digitally transmitted signals provided to the equalizing circuit for equalization, passes through the threshold decision element (2) and a threshold (SET) of the threshold decision element changes an output signal (11) of the equalizing circuit, and
   a clock circuit (A), which detects a rising or falling edge of the input signal (1) by comparing the input signal (1) to a threshold (Us) and regenerates the signal clock pulse (C) by means of synchronizing with this rising or falling edge.

15. The equalizing circuit according to claim 14, wherein the clock circuit (A) includes a first circuit (MFLP) that compares the input signal (1) to the threshold (Us) in order to limit an amplitude of the input signal to a value range (Umin; Umax) predetermined by the threshold, and detects the rising or falling edge of the amplitude-limited input signal (1') within a predeterminable time window in order to generate output pulses (FP) of uniform duration (TM) and that the clock circuit (A) includes a second circuit (PLL) that follows the first circuit (MFLP) and regenerates the signal clock pulse (C) from the output pulses (FP) by synchronizing with its edges.

16. The equalizing circuit of claim 15, further comprising:
   a detector circuit (13), responsive to the input signal, for providing an eye signal (Ueye); and
   a control circuit (12), responsive to the eye signal, for providing the threshold (SET).

17. The equalizing circuit of claim 16, wherein the detector circuit (13) comprises:
   a comparator responsive to the input signal (1) delayed by a delay filter (114) and also responsive to the output signal (11), for providing a difference signal; and
   an eye detector (ED), responsive to the difference signal, for providing the eye signal.

* * * * *

UNITED STATES PATENT AND TRADEMARK OFFICE
CERTIFICATE OF CORRECTION

PATENT NO.    : 6,256,342 B1
DATED         : July 3, 2001
INVENTOR(S)   : E. Schlag et al.

It is certified that error appears in the above-identified patent and that said Letters Patent is hereby corrected as shown below:

<u>Title page,</u>
Item [56], under U.S. PATENT DOCUMENTS, please insert
    --3,737,790    6/1973  Brown  328/165 --;

under FOREIGN PATENT DOCUMENTS, please insert
    -- 0716516    6/1996  (EP)
      19526257    1/1997  (DE) --; and under OTHER PUBLICATIONS, please insert
-- Patent Abstracts of Japan 07-307764, pub. 11/21/95 for Japanese Patent application 07-024395, filed 02/13/95. --.

Signed and Sealed this

Thirtieth Day of July, 2002

*Attest:*

*Attesting Officer*

JAMES E. ROGAN
*Director of the United States Patent and Trademark Office*